United States Patent [19]

Tanaka

[11] Patent Number: 5,581,412
[45] Date of Patent: Dec. 3, 1996

[54] FLEXIBLE PRINTED CIRCUIT BOARD SUPPORTING STRUCTURE OF LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 362,884

[22] Filed: Dec. 23, 1994

[30] Foreign Application Priority Data

Dec. 27, 1993 [JP] Japan .................................. 5-333191
Feb. 10, 1994 [JP] Japan .................................. 6-016495

[51] Int. Cl.⁶ .............................. G02B 15/14; G02B 7/02
[52] U.S. Cl. ........................ 359/697; 359/704; 359/823
[58] Field of Search ................................ 359/697, 704, 359/823, 824, 698

[56] References Cited

U.S. PATENT DOCUMENTS

| | | | |
|---|---|---|---|
| 4,944,030 | 7/1990 | Haraguchi et al. | 354/403 |
| 5,012,273 | 4/1991 | Nakamura et al. | 354/485 |
| 5,016,032 | 5/1991 | Haraguchi et al. | 354/195.1 |
| 5,033,819 | 7/1991 | Tanaka | 359/704 |
| 5,051,764 | 9/1991 | Nomura | 354/195.1 |
| 5,056,903 | 10/1991 | Nakamura | 359/513 |
| 5,144,493 | 9/1992 | Nomura | 359/700 |
| 5,164,757 | 11/1992 | Nomura | 354/403 |
| 5,231,449 | 7/1993 | Nomura | 354/485 |
| 5,276,552 | 1/1994 | Kohmoto et al. | 359/601 |
| 5,302,991 | 4/1994 | Nakayama | 354/195.12 |
| 5,327,184 | 7/1994 | Nomura et al. | 354/195.1 |
| 5,371,569 | 12/1994 | Tanaka | 354/485 |
| 5,453,807 | 9/1995 | Iizuka | 354/195.1 |

FOREIGN PATENT DOCUMENTS 64-45829  3/1989  Japan .
4114013  10/1992  Japan .

OTHER PUBLICATIONS

The English Translation of Japanese Utility Model Publication No. 64-45829.

The English Translation of Japanese Utility Model Publication No. 4-114013.

Primary Examiner—Georgia Y. Epps
Assistant Examiner—Ricky Mack
Attorney, Agent, or Firm—Greenblum & Bernstein P.L.C.

[57] ABSTRACT

A flexible printed circuit board supporting structure for mounting a flexible printed circuit board in a restricted space without using an exclusive member to support the flexible printed circuit board. A lens barrel includes a fixed lens barrel integrally secured to a camera body and a movable lens barrel positioned in the fixed lens barrel and movable in the direction of the optical axis. An electrically driven device such as a shutter is mounted to the movable lens barrel and a controller for the electrically driven device is mounted to the camera body. A flexible printed circuit board electrically connects the controller to the electrically driven device. The flexible printed circuit board is connected to the electrically driven device and is extracted toward the rear of a camera in the movable lens barrel. The flexible printed circuit board also extends toward the front of the camera in a space formed between the fixed lens barrel and the movable lens a barrel and is drawn out of the fixed lens barrel from the front portion thereof. The flexible printed circuit board is supported in a space formed by the outer periphery of a light intercepting member which is disposed between the fixed lens barrel and the movable lens barrel, and the inner peripheral portion of the fixed lens barrel.

15 Claims, 12 Drawing Sheets

FLEXIBLE PRINTED CIRCUIT BOARD SUPPORTING STRUCTURE OF LENS BARREL

BACKGROUND OF THE INVENTION

1. Field of the Invention

The present invention relates to a lens barrel of still cameras or video cameras.

2. Description of the Related Art

In recent years, cameras such as lens-shutter-type cameras are provided with a fixed lens barrel secured to a camera body and a movable lens barrel which is supported in the fixed lens barrel and is movable in relation to the camera body in a direction parallel to an optical axis. In the camera with the above-mentioned construction, generally, a ring-shaped light intercepting member is provided at the front portion of the camera body to prevent external light from entering from a gap between the fixed lens barrel and the movable lens barrel.

Further, a shutter and automatic focusing device (hereinafter referred to as a "shutter") are provided in the movable lens barrel for a photographing lens, and the shutter and control device therefor are connected to each other with a flexible printed circuit board. Generally, an exclusive member for supporting the flexible printed circuit board is mounted to permit it to follow the movement of the movable lens barrel, while the exclusive member does not enter a photographing optical path, nor prevents the movement of a lens group.

When the light intercepting member is deformed, for instance, and a gap is generated between the light intercepting member and the movable lens barrel, external light enters from a gap between both lens barrels in spite of the light intercepting member. One method of eliminating this drawback to elongate the light intercepting member in the direction of the optical axis to prevent the external light regardless of the deformation of the light intercepting member. In such a case, however, extra space is required for the enlarged light intercepting member, which adversely affects the miniaturization of cameras.

SUMMARY OF THE INVENTION

The present invention has been made in consideration of the above-mentioned prior art. It is therefore an object of the present invention to provide a flexible printed circuit board supporting structure to mount the flexible printed circuit board in a limited space without an exclusive member for supporting the flexible printed circuit board.

Another object of the present invention is to provide a light intercepting device for a lens barrel to securely prevent external light from entering from the gap between the fixed lens barrel and the movable lens barrel, while maintaining the length of the lens barrels in the direction of the optical axis.

Accorording to one aspect of the present invention, there is provided a flexible printed circuit board mounting structure in a lens barrel which includes a fixed lens barrel integrally secured to a camera body a movable lens barrel accommodated in the fixed lens barrel; and movable in a direction of an optical axis of the lens; an electrically driven device which is mounted to the movable lens barrel; a controller for controlling the electrically driven device, which is mounted to the camera body; a light intercepting member which is disposed between the fixed lens barrel and the movable lens barrel, and a flexible printed circuit board electrically connecting the controller and the electrically driven device. The flexible printed circuit board connected to the electrically driven device has a first path extending rearwardly in the movable lens barrel, a second path extending in a space formed between the fixed lens barrel and the movable lens barrel, in which the first path and the second path are folded in a serpentined manner, and a third path extending in a space formed between an outer periphery of the light intercepting member and an inner peripheral portion of the fixed lens barrel.

Further, another flexible printed circuit board supporting structure according to the present invention is characterized in that, in the above-mentioned supporting structure, the light intercepting member includes a C-shaped printed circuit board restriction ring made of resilient material for resiliently fastening the outer peripheral surface of the movable lens barrel.

In this case, the fixed lens barrel may include an engagement portion and the printed circuit board restriction ring includes a positioning engagement portion engaged with the engagement portion of the fixed lens barrel to prevent the printed circuit board restriction ring from rotating about the optical axis and moving in the direction of the optical axis.

It is preferable that the fixed lens barrel is provided with a concave printed circuit board accommodating portion on the inner surface thereof, at least at the position opposing the light intercepting member.

It is preferable that the light intercepting member includes a C-shaped printed circuit board restriction ring made of resilient material for resiliently fastening the outer peripheral surface of the movable lens barrel; and a light intercepting curtain which is inserted between the C-shaped printed circuit board restriction ring and the movable lens barrel.

In this case, the printed circuit board restriction ring is provided with a flange at the front end, outer peripheral portion thereof. The flexible printed circuit board is positioned in a space formed by the rear end surface of the flange, the outer peripheral surface of the printed circuit board restriction ring, and the inner peripheral portion of the fixed lens barrel.

In the above-mentioned construction, it is preferable that the light intercepting curtain is attached to a support ring of the fixed lens barrel, and the inner peripheral portion of the light intercepting curtain on the movable lens barrel side is bent in a forward or rearward direction of the optical axis, or the printed circuit board restriction ring is provided with a light intercepting brush on the inner periphery thereof which slidably contacts the outer periphery of the movable lens barrel.

According to another aspect of the invention, there is provided a light intercepting device of a lens barrel which includes a fixed lens barrel secured to a camera body; a movable lens barrel supported in the fixed lens barrel and movable in a direction of an optical axis of the lens; and a light intercepting device for preventing light from entering from a portion between the fixed lens barrel and the movable lens barrel. The light intercepting device includes a first light intercepting ring which is fixed to the fixed lens barrel and is slidably engaged with an outer pheriphery of the movable lens barrel; and a second light intercepting ring which is fixed to the fixed lens barrel and is slidably engaged with an outer pheriphery of the movable lens barrel. The second light intercepting ring is located behind the first light intercepting ring in the optical axis direction. The first light intercepting ring has a flange portion secured to the fixed lens barrel and a cylindrical portion which is in contact with the outer pheriphery of the movable lens barrel. The cylindrical portion extends rearwardly from an inner edge of the flange portion and the second light intercepting ring has an annular portion which forms an accommodating space for the cylindrial portion.

With the light intercepting device according to the present invention, two light intercepting rings are disposed between the fixed lens barrel and the movable lens barrel in a line in the direction of the optical axis, which securely prevents the intrusion of external light.

Further, the rear bent portion which is bent in the rearward direction of the optical axis is positioned in an accommodating space of the second light intercepting ring and parts of the bent portion and the second light intercepting ring contact each other on a plane vertical to the optical axis, which shortens the dimension of the light intercepting mechanism in the direction of the optical axis; although two light intercepting rings are provided.

In the aforementioned construction, the second light intercepting ring is preferably provided with a light intercepting brush on the inner peripheral portion thereof in the rear of the accommodating space.

Further, another light intercepting device according to the present invention is characterized in that, in the above-mentioned device, the movable lens barrel moves between an extended position and an accommodated position relative to a camera body. A tiered portion with a small diameter is provided on the same plane as the front wall of the camera body at the accommodated position, and the rear bent portion is not in contact with the tiered portion throughout the range that the movable lens barrel travels between the extended position and the accommodated position, resulting in further effective light interception.

Still further, in the light intercepting device according to the present invention, it is possible to mount a flexible printed circuit board which is extracted from the rear of the movable lens barrel in the direction of the optical axis and is drawn from the front portion of the fixed lens barrel out of the lens barrel. The second light intercepting member functions as a printed circuit board restriction mechanism for restricting the movement of the flexible printed circuit board in relation to the fixed lens barrel. The second light intercepting mechanism acts as a mechanism for sustaining the flexible printed circuit board on the fixed lens barrel, contributing to the reduction in the number of parts of cameras.

The present disclosure relates to subject matter contained in Japanese Patent Application Nos. 05-333191 (filed on Dec. 27, 1993) and 06-16495 (filed on Feb. 10, 1994) which are expressly incorporated herein by reference in their entireties.

BRIEF DESCRIPTION OF THE DRAWINGS

The present invention will be more apparent from the following description with reference to the accompanying drawings.

DETAILED DESCRIPTION OF PREFERRED EMBODIMENTS

Figure 1:
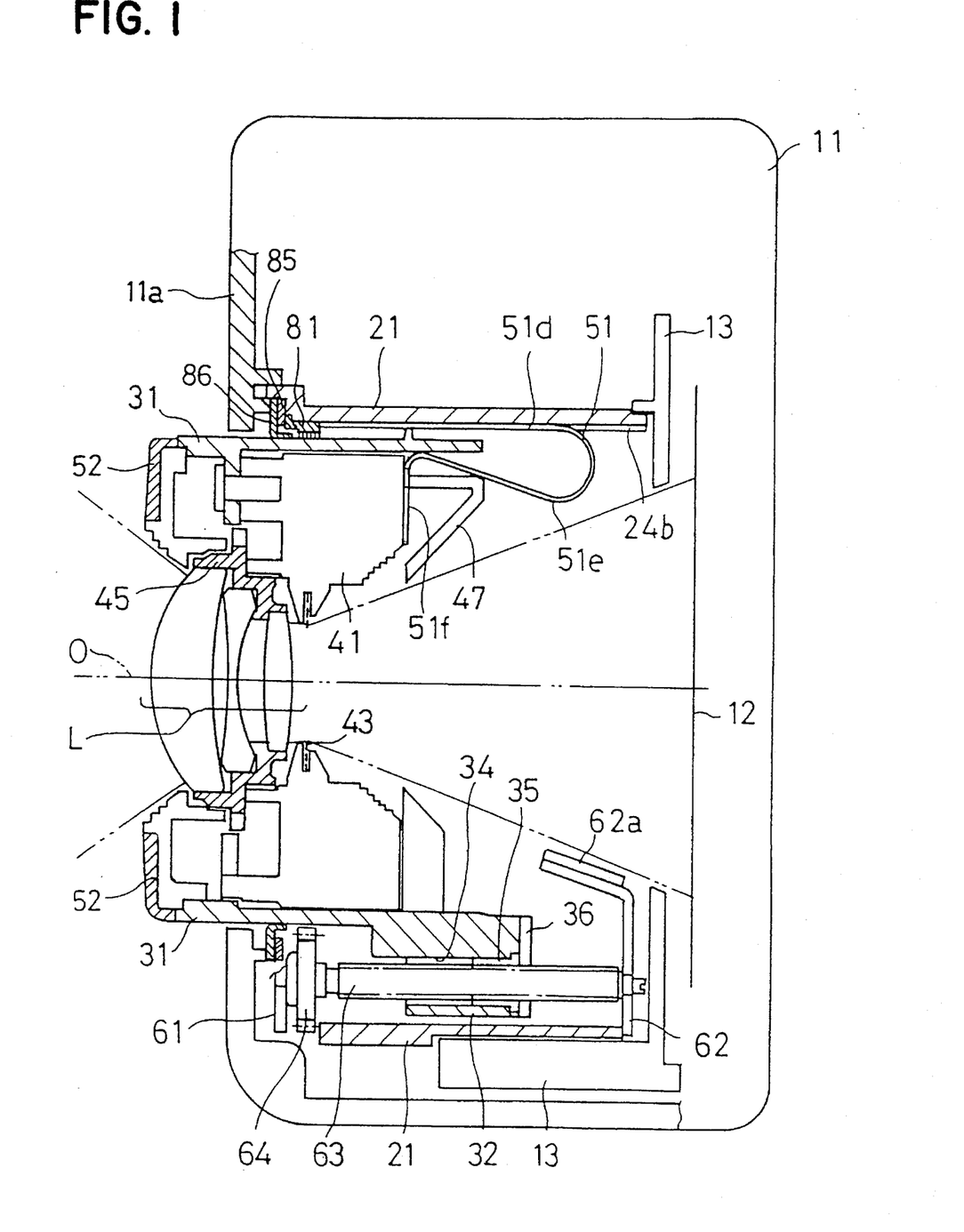
FIG. 1 is a cross-sectional view of a primary portion of a leaf-shutter-type camera according to a first embodiment of the present invention which is laterally cut along an optical axis.
Figure 2:
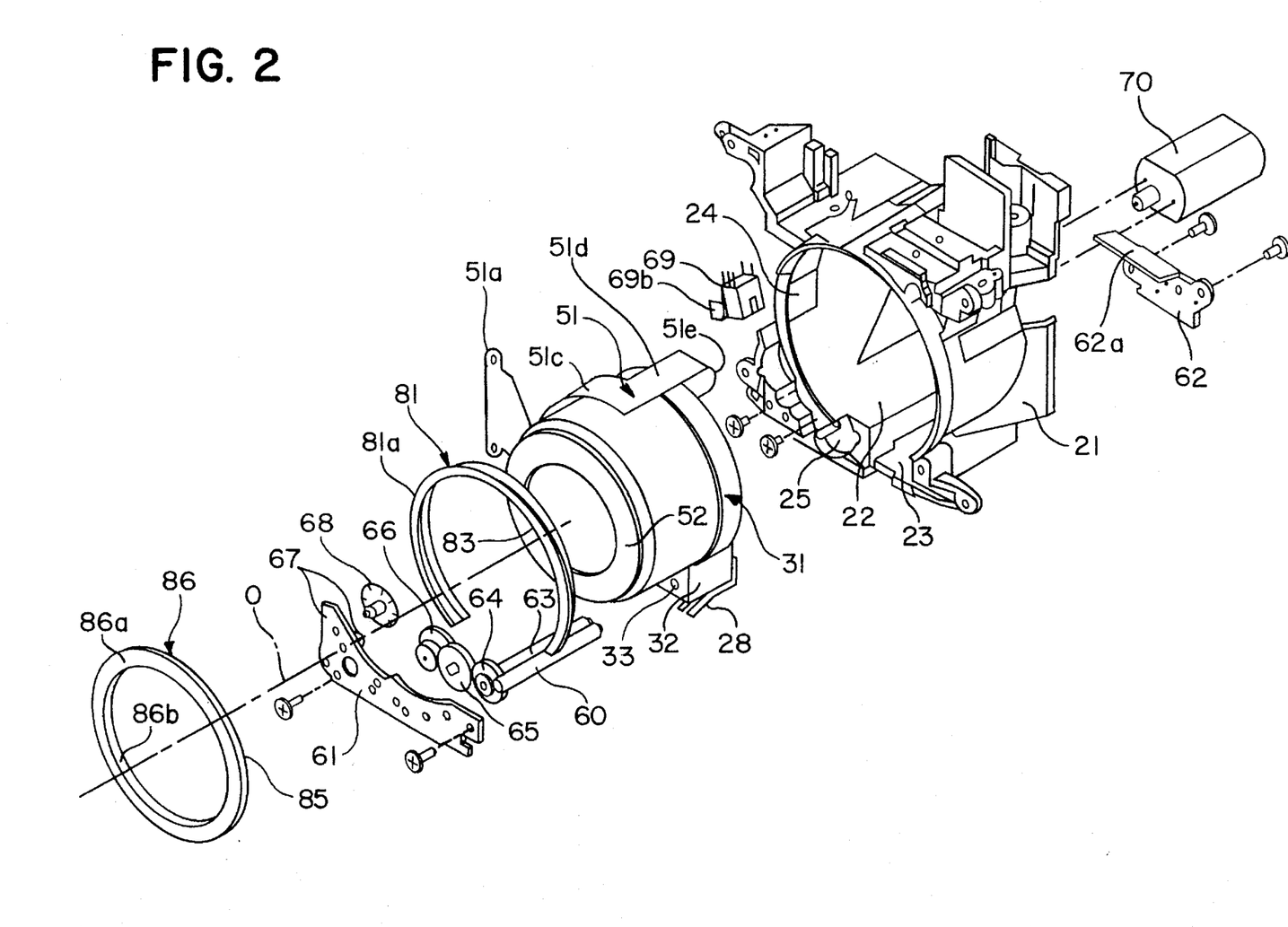
FIG. 2 is an exploded perspective view of the primary portion of the leaf-shutter-type camera shown in FIG. 1.

A flexible printed circuit board supporting structure of a lens barrel according to the present invention will be explained with reference to the drawings. FIG. 1 is a cross-sectional view of a primary portion of a single focus leaf-shutter-type camera with a collapsible barrel to which the present invention is applied. The primary portion is laterally cut along an optical axis. FIG. 2 is an exploded perspective view of a primary portion of a lens barrel unit of the leaf-shutter-type camera.

In the figures, numeral 11 shows a camera body, is provided with a fixed block 13 therein. A fixed lens barrel 21 is integrally secured to the block 13, and a movable lens barrel 31, to which primary optical members such as a shutter block 41 and a lens group L are mounted, is movably accommodated in a cylindrical movable lens barrel accommodating portion 22 formed in the fixed lens barrel 21 in the direction of optical axis. The movable lens barrel accommodating portion 22 is provided with a guide groove 23 extending in the direction parallel to the optical axis O, and a guide projection 32 on the outer peripheral surface of the movable lens barrel 31 is movably accommodated in the guide groove 23. The guide projection 32 is provided with two guide holes 33, 34 extending in the direction parallel to the optical axis O. The shutter block 41, a CPU, a power source (not shown) and other components in the camera body 11 are electrically connected to each other with a flexible printed circuit board 51.

A guide pole 60 extending in the direction parallel to the optical axis O, which is fixed in the guide groove 23, is slidably engaged with one of the guide holes 33, which allows the movable lens barrel 31 to be slidably guided in relation to the movable lens barrel accommodating portion 22 in the direction parallel to the optical axis O. A female thread member 35 is inserted in the other guide hole 34 and is secured to the guide projection 32 by a fixing plate 36. Since a feed screw 63 is engaged with the female thread member 35 to linearly move the movable lens barrel 31 in the direction of optical axis, the rotation of the feed screw 63 causes the movable lens barrel 31 to linearly move in the direction of the optical axis while guided by the guide pole 60.

The front and rear end portions of the guide pole 60 are supported by a plate 61 and a bearing plate 62 respectively, which are secured to the fixed lens barrel 21 through screws. Further, the front and rear end portions of the feed screw 63 are also rotatably supported by the plate 61 and the bearing plate 62, respectively. A brush 28 for relatively roughly detecting the position of the movable lens barrel 31 in the direction of optical axis, and an AF code plate (not shown) are provided on the lower surface of the guide projection 32 the bottom surface of the guide groove 23, respectively. The bearing plate 62 is bent at the upper portion thereof to form a light intercepting portion 62a, which intercepts harmful reflection light from the guide pole 60 and the like. An antireflection member is attached to a surface of the light intercepting portion 62a on the side of a photographing optical axis.

Gears 65, 66, and 67 composing a reduction gear train is supported by the parent plate 61 through shafts. A gear 64 is secured to the front end portion of the feed screw 63, and the feed screw 63 rotates an encoder plate 68 through the gear 65 meshing the gear 64, and the gears 66, 67 meshing the gear 65. The encoder plate 68 includes a known rotation detecting mechanism in combination with a photo interrupter 69 to detect the rotation of the feed screw 63, that is, the position of the fixed lens barrel 21. Further, the feed screw 63 is driven by a motor 70 mounted to the fixed lens barrel 21 through a motor pinion and the gears 64 to 66. Reference symbol 69b in FIG. 2 is a cushion mounted in pressed state between the photo interrupter 69 and the plate 61. The resilient recovery force of the cushion presses the photo interrupter 69 to the plate 61. Numeral 25 in FIG. 2 shows a space in the fixed lens barrel 21 for accommodating encoder plate 68, the photo interrupter 69 and the gear train.

Figure 9:
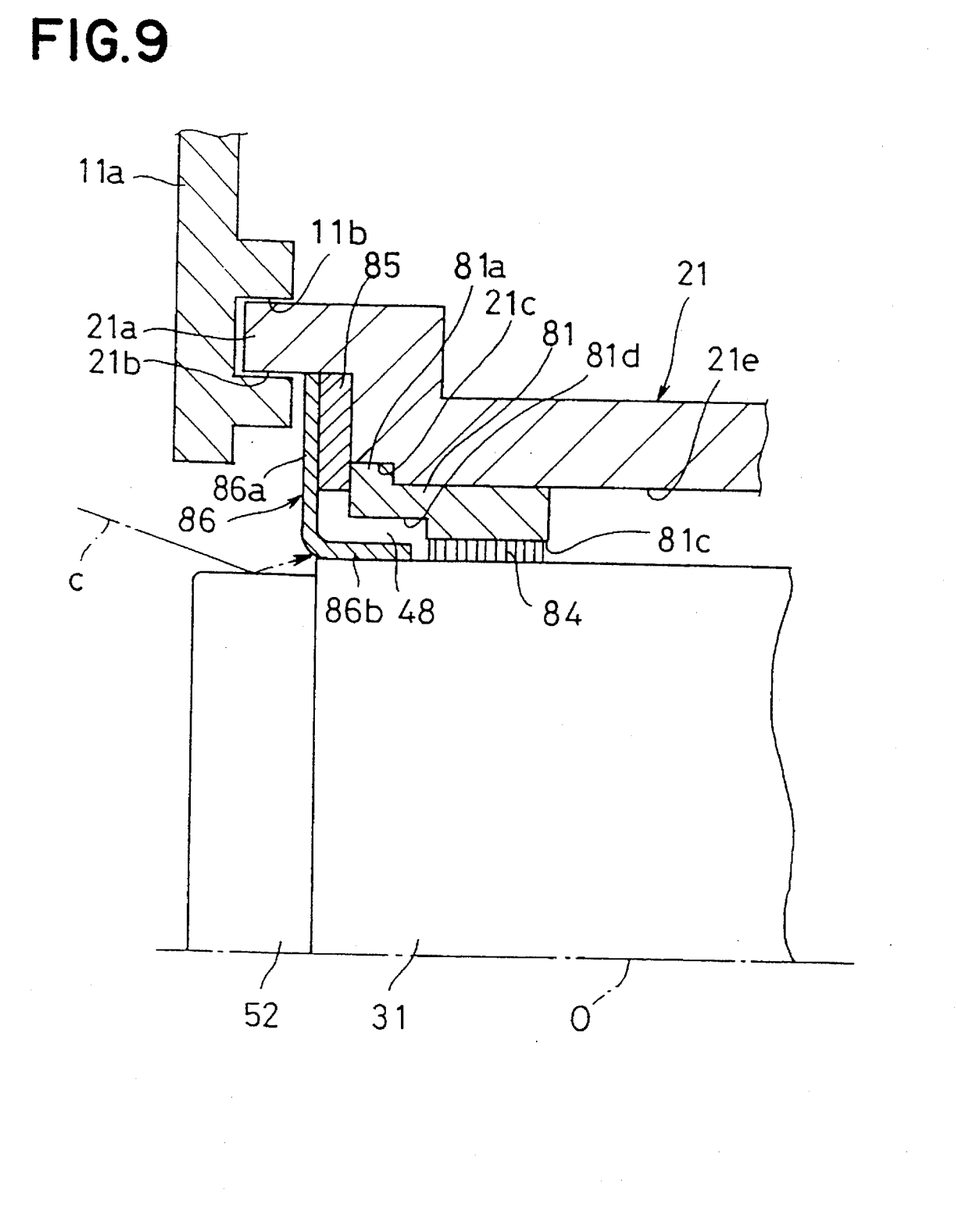
FIG. 9 is an enlarged cross-sectional view of a portion adjacent to a mounting portion of a flexible printed circuit board according to a second embodiment of the present invention, which corresponds to FIG. 5 in the first embodiment.

The movable lens barrel 31 is provided with a decorative plate 52 at the front end portion thereof. The decorative plate 52 is situated on substantially the same plane as a front wall 11a of the camera body 11 in an accommodated state as illustrated in FIG. 9. The shutter block 41 is secured in the movable lens barrel 31 as shown in FIG. 1. The shutter block 41 is provided with normally closed shutter blades 43, and when a predetermined shutter driving signal is inputted from a shutter control device through the flexible printed circuit board 51, the shutter blades 43 are open and closed to provide a prescribed exposure. A photographing lens group L is fixed to the front end portion of the shutter block 41 by way of a lens supporting frame 45. Reference numeral 47 in FIG. 1 is a shutter mask for intercepting light other than a light forming image and functions as a cover for the flexible printed circuit board 51 which is exposed on the side of the inner face 81 of the shutter block 41.

Figure 3:
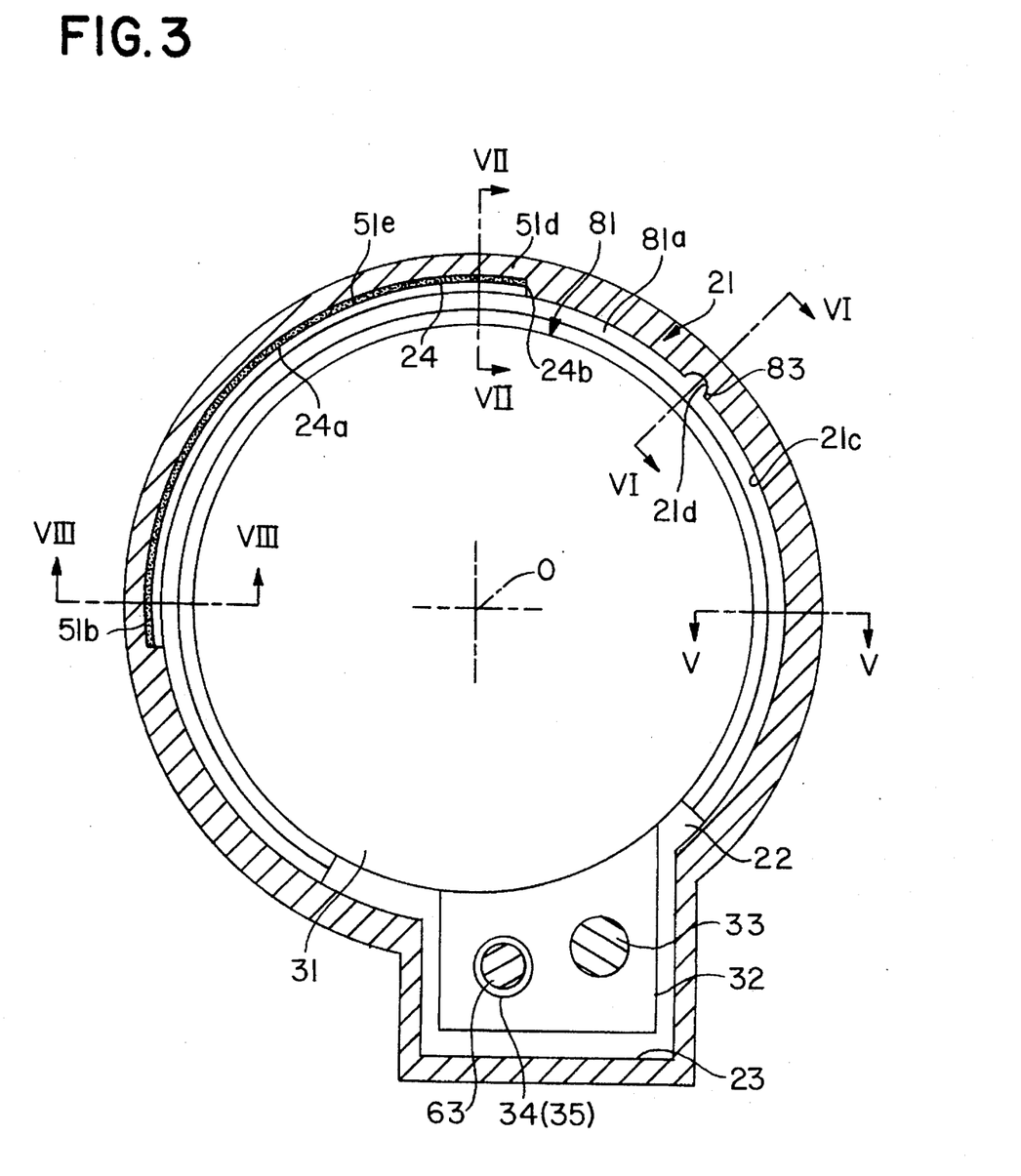
FIG. 3 is a front cross-sectional view of a portion adjacent to a mounting portion of the flexible printed circuit board which is cut in a direction perpendicular to the optical axis.
Figure 4:
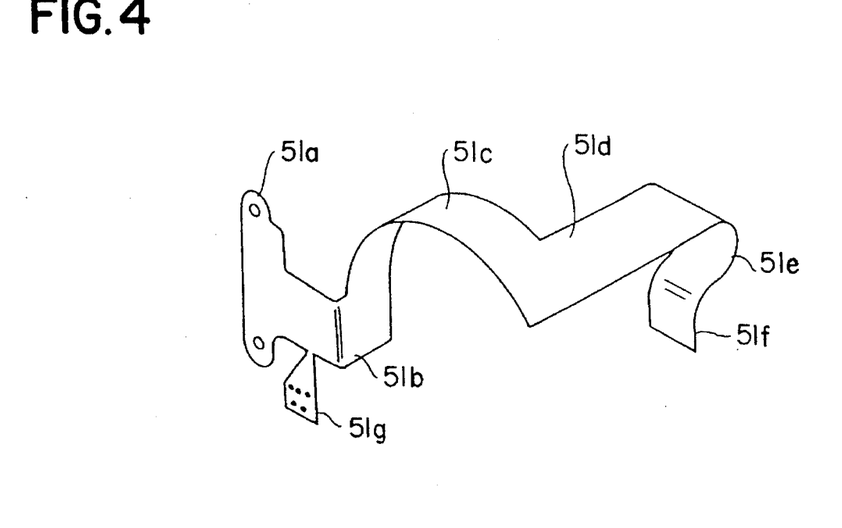
FIG. 4 is a perspective view of the flexible printed circuit board according to the first embodiment of the present invention.

Basic construction of cameras to which the present invention is applied is described above. Next, the mounting structure of the flexible printed circuit board 51 characterizing the present invention will be explained with reference to FIGS. 3 to 8. FIG. 3 is a front cross-sectional view of a portion adjacent to a mounting portion of the flexible printed circuit board 51 which is cut in the direction perpendicular to the optical axis. FIG. 4 is a perspective view of the flexible printed circuit board 51 illustrated in FIG. 3. And FIGS. 5 to 8 are enlarged cross-sectional views of the portion adjacent to the mounting portion which are taken along the lines V—V, VI—VI, VII—VII, VIII—VIII of FIG. 3.

A peripheral round portion 51c and a straight portion 51d of the flexible printed circuit board 51 is accommodated in a concave printed circuit board accommodating portion 24 formed on the inner peripheral surface of the movable lens barrel accommodating portion 22. An end portion 51a of the board 51 is drawn into the camera body 11 from the front end portion of the fixed lens barrel 21. Another end portion extends to the rear portion of the movable lens barrel 31 and is drawn into the movable lens barrel 31 by way of a bent portion 51e so as to be connected to the shutter block 41.

The shape of the flexible printed circuit board 51 is illustrated in FIG. 4. The flexible printed circuit board 51 includes a bent portion 51b inserted into the fixed lens barrel 21 from a gap between a photo interrupter 51g and the fixed lens barrel 21; a peripheral round portion 51c along the concaved printed circuit board accommodating portion 24; a straight portion 51d which is bent at an end of the peripheral round portion 51c and extends in the direction parallel to the optical axis X toward the firm face 12 beyond the rear of the movable lens barrel 31; the bent portion 51e is inversely turned at 180 degrees at an end of the straight portion 51d and enters the movable lens barrel 31; and an end portion 51f which is turned in the direction of the optical axis O and connected to the shutter block 41. The above portions 51b to 51f are located from the connecting portion 51a, which is connected to a connecting mechanism in the camera body 11 out of the fixed lens barrel 21, in the aforementioned order. The bent portion 51e stretches and shrinks in the direction of the optical axis to follow the movement of the movable lens barrel 31 in the same direction.

FIG. 3 shows the flexible printed circuit board 51 accommodated in the concave printed circuit board accommodating portion 24. The accommodating portion 24 is provided with a peripheral concave portion 24a extending in the circumferential direction to accommodate the peripheral round portion 51c, and a straight concave portion 24b extending in the direction of the optical axis to accommodate the straight portion 51d, which are not indicated in the drawings in detail.

A C-shaped light intercepting ring 81 (light leak preventing member) as a printed circuit board restriction ring, and a ring-shaped light intercepting curtain 86 are disposed between the end of the fixed lens barrel 21 and the movable lens barrel 31 to prevent external light from entering the gap between them. The light intercepting ring 81 is made of synthetic resin with a resilient member or the like to form a letter C and is fastened to the movable lens barrel 31 through its resiliency.

Figure 5:
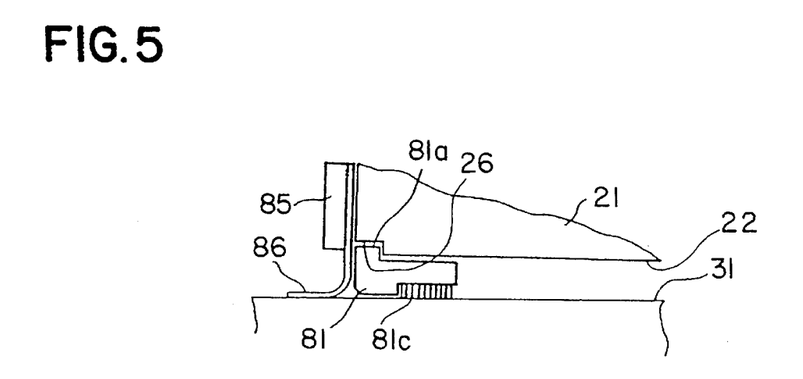
FIG. 5 is an enlarged cross-sectional view of the portion adjacent to the mounting portion which is taken along the line V—V of FIG. 3.
Figure 6:
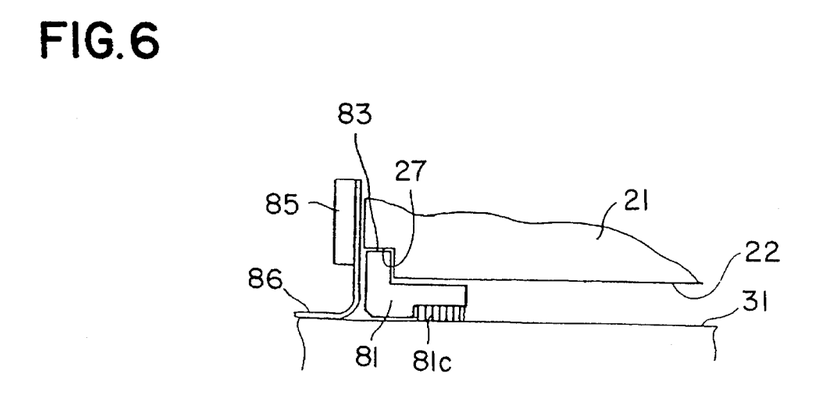
FIG. 6 is an enlarged cross-sectional view of the portion adjacent to the mounting portion which is taken along the line VI—VI of FIG. 3.

A flange 81a on an outer peripheral surface of the light intercepting ring 81 is engaged with an engagement portion 26 on an inner peripheral surface of the movable lens barrel accommodating portion 22 as illustrated in FIG. 5. Further, a positioning projection 83 on the flange 81a is engaged with a positioning hole 27 on the bottom surface of the engagement portion 26 as shown in FIG. 6 to sustain the light intercepting ring 81 so as not to be movable in the direction of the optical axis nor rotatable about the optical axis. The flange 81a, the positioning projection 83, the engagement portion 26 and the positioning hole 27 compose a connecting portion. Light intercepting brush 81c is attached to the inner peripheral surface of the light intercepting ring 81 and tips of bristles of the brush 81c resiliently contact the movable lens barrel 31 to intercept light between the light intercepting ring 81 and the movable lens barrel 31.

The light intercepting curtain 86 is attached to a support ring 85 between the fixed lens barrel 21 and a front cover to intercept light between the light intercepting ring 81 and the movable lens barrel accommodating portion 22 as well as between the fixed lens barrel 21 and the movable lens barrel 31. The light intercepting curtain 86 completely intercepts light, particularly at a portion adjacent to the bent portion 51b where the flexible printed circuit board 51 is drawn out of the movable lens barrel 22 (where the flexible printed circuit board 51 is drawn into the movable lens barrel accommodating portion 22).

Figure 7:
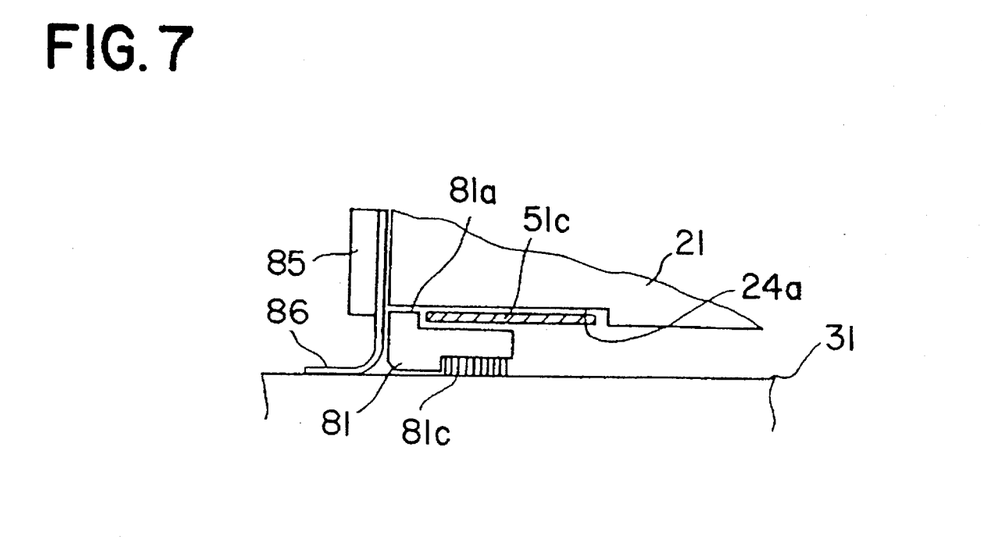
FIG. 7 is an enlarged cross-sectional view of the portion adjacent to the mounting portion which is taken along the line VII—VII of FIG. 3.

Next, the relationship between the light intercepting ring 81 and the flexible printed circuit board 51 will be explained with reference to FIGS. 7 and 8. The peripheral round portion 51c of the flexible printed circuit board 51 is accommodated and secured in the space enclosed by the outer peripheral surface of the light intercepting ring 81 in printed circuit board accommodating portion 24 and the flange 81a.

Figure 8:
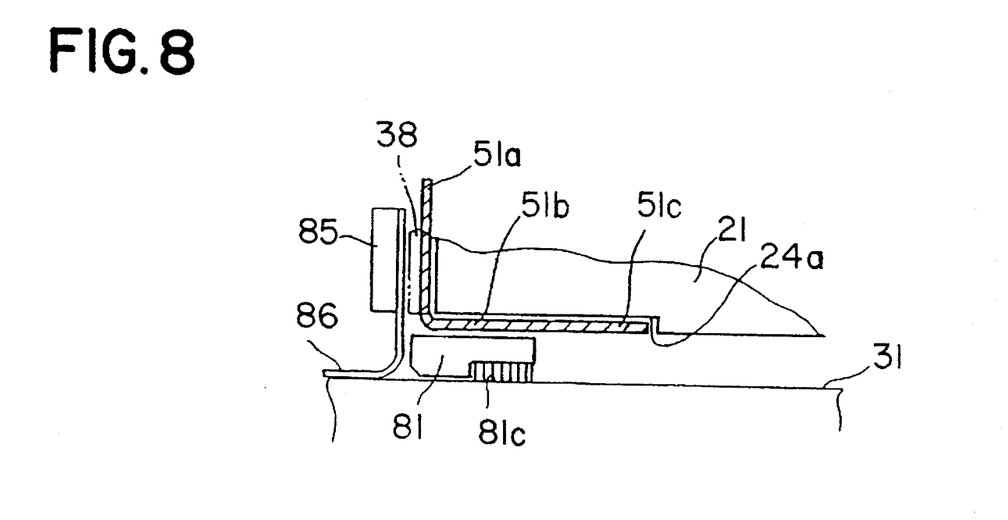
FIG. 8 is an enlarged cross-sectional view of the portion adjacent to the mounting portion which is taken along the line VIII—VIII of FIG. 3.

As illustrated in FIG. 8, the flange 81a is not provided at a portion where the flexible printed circuit board 51 is extracted from the movable lens barrel accommodating portion 22 to inside of the camera body 11. As a result, the end portion 51a of the flexible printed circuit board 51, which follows the bent portion 51b, passes through a guide groove 38 radially extending from an end of the movable lens barrel accommodating portion 22 to get out of the accommodating portion 22, and extends in the fixed block 13. As described above, the flexible printed circuit board 51 according to the first embodiment of the present invention is retained on the fixed lens barrel 21 by the light intercepting ring 81 as a light leak preventing member for a portion between the movable lens barrel 31 and the camera body 11, which eliminates an exclusive member for retaining the flexible printed circuit board 51.

In the above-mentioned embodiment, the peripheral round portion 51c is accommodated in the printed circuit board accommodating portion 24 of the movable lens barrel accommodating portion 22 along a quarter of the periphery thereof. As a result, the peripheral portion 51c is pressed by the light intercepting ring so that the flexible printed circuit board 51 is prevented from being bent or hanging down. The length that the peripheral round portion 51c of the flexible printed circuit board 51 is in contact with the printed circuit board accommodating portion 24 of the movable lens barrel accommodating portion 22 is not limited to a quarter of the periphery thereof but is freely determined. In the present invention, it is possible not to provide the peripheral round portion 51c to the flexible printed circuit board 51. The flexible printed circuit board mounting structure according to the present invention is applicable to lens barrels with other constructions, such as lens barrels other than the collapsible barrel, and zoom lens barrels.

As described above, in the flexible printed circuit board mounting structure according to the first embodiment of the present invention, the flexible printed circuit board connecting electrical members in the movable lens barrel and those in the camera body to each other while permitting the movement of the movable lens barrel is retained in the space enclosed by the light leak preventing mechanism for a portion between the movable lens barrel and the fixed lens barrel, which eliminates an exclusive member for supporting the flexible printed circuit board, contributing to simple assembly work a reduction in size and weight of the camera.

Next, the second embodiment of the present invention, in which intrusion of external light is prevented, will be explained with reference to FIGS. 9 to 15. In this embodiment, a fixed ring 21 includes a front end portion 21a which is engaged with an engagement portion 11b projecting from an inner surface of a front wall 11a of a camera body 11; a supporting portion with a large diameter 21b to engage a light intercepting curtain 86 together with a supporting ring 85; an engagement portion 21c for a flange 81a; a positioning hole 21d formed in the engagement portion 21c as illustrated in FIG. 10; and a portion with small diameter 21e, from the front portion to the rear portion thereof in this order.

Figure 10:
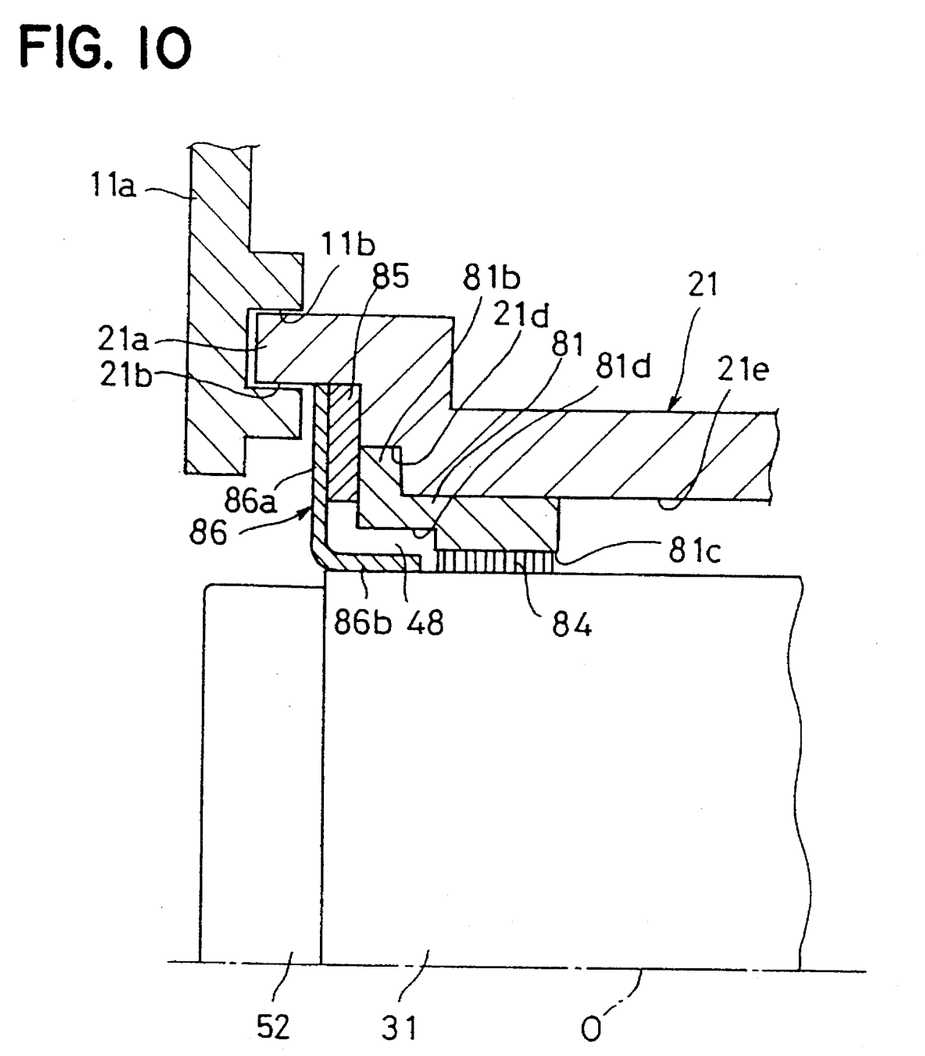
FIG. 10 is an enlarged cross-sectional view of the portion adjacent to the mounting portion of the flexible printed circuit board according to the second embodiment of the present invention, which corresponds to FIG. 6 in the first embodiment.
Figure 11:
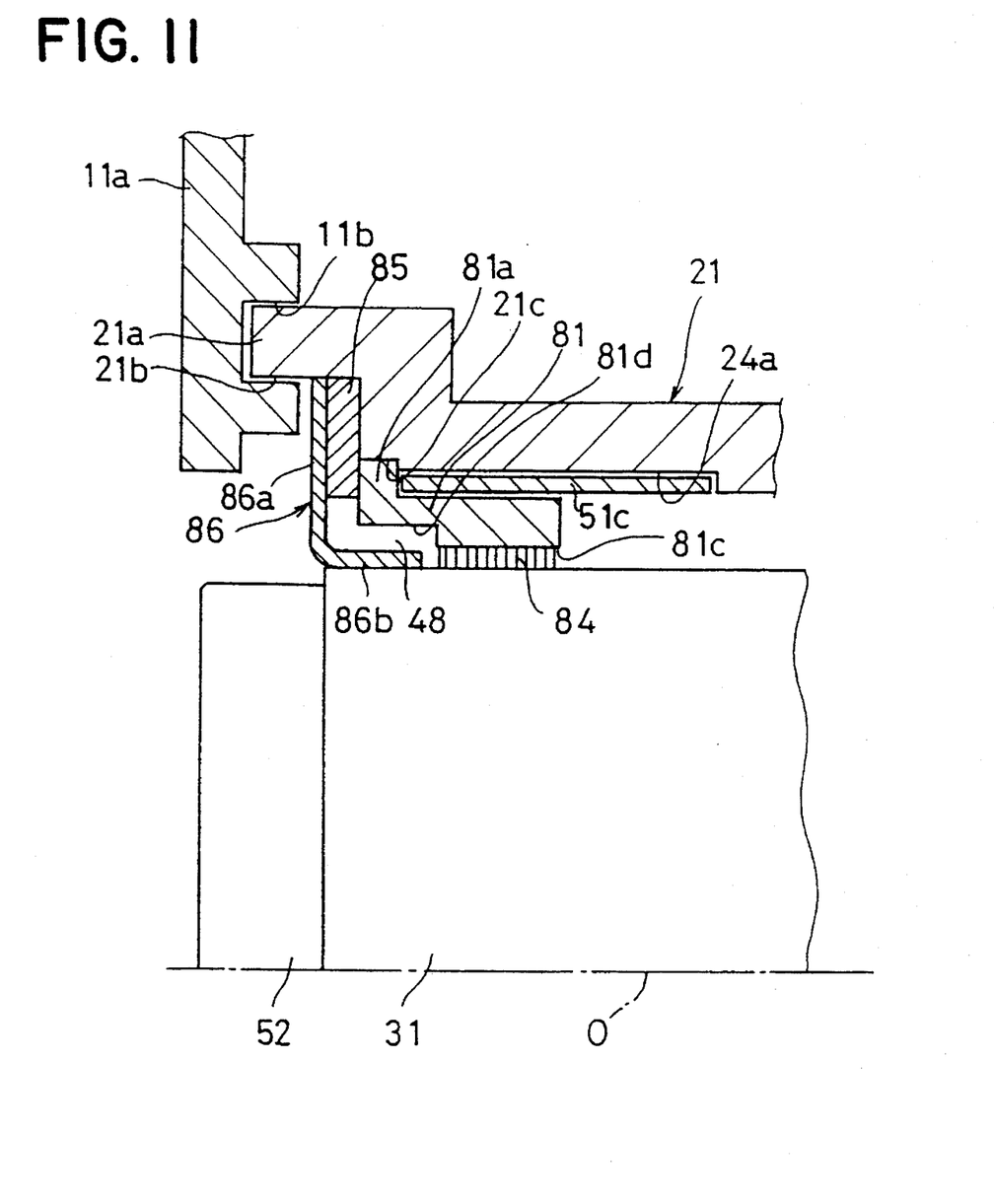
FIG. 11 is an enlarged cross-sectional view of the portion adjacent to the mounting portion of the flexible printed circuit board according to the second embodiment of the present invention, which corresponds to FIG. 7 in the first embodiment.
Figure 12:
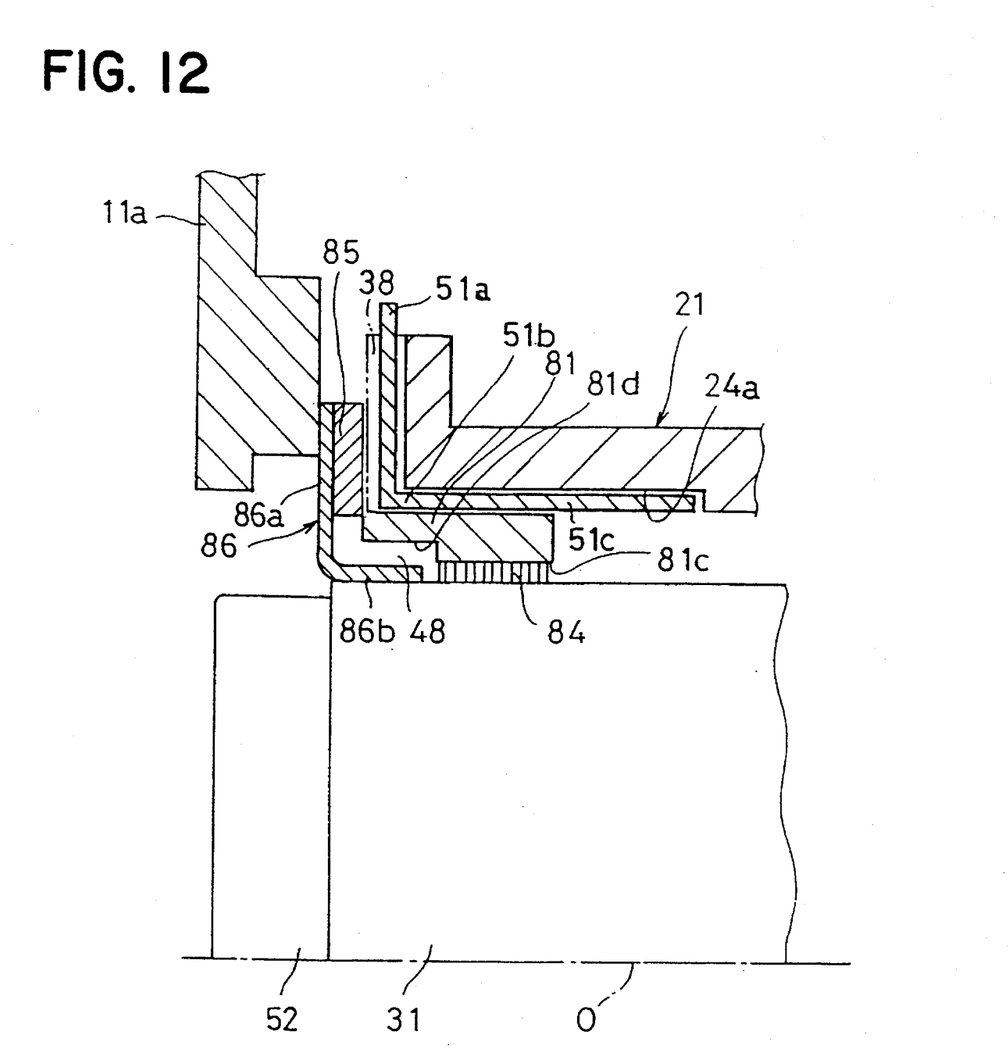
FIG. 12 is an enlarged cross-sectional view of the portion adjacent to the mounting portion of the flexible printed circuit board according to the second embodiment of the present invention, which corresponds to FIG. 8 in the first embodiment.
Figure 13:
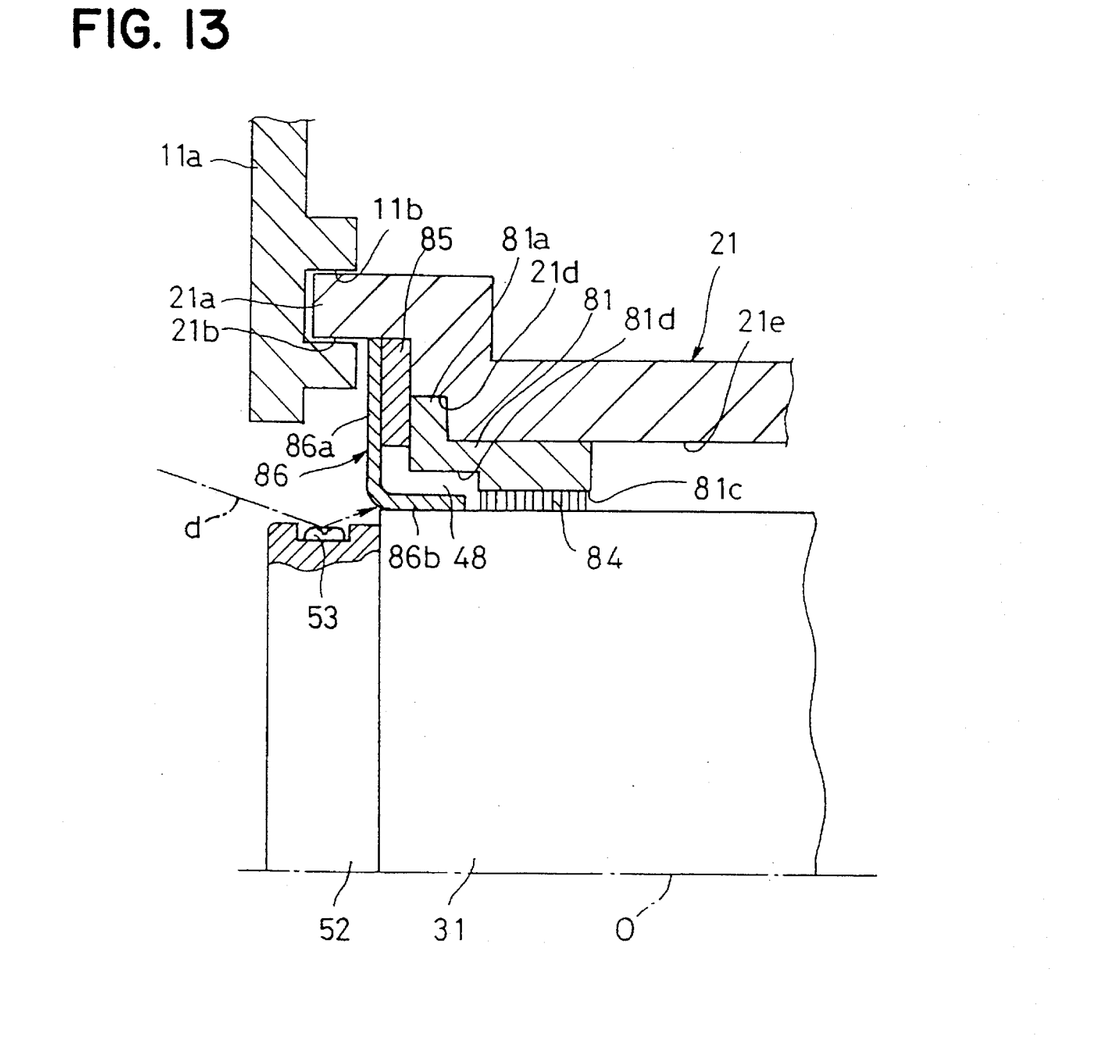
FIG. 13 is an enlarged cross-sectional view of the portion adjacent to the mounting portion shown in FIG. 9 in which machine screws are engaged with a decorative plate.

A printed circuit board restriction ring 81 includes a flange 81a projecting on an outer peripheral surface thereof; a positioning projection 81b (see FIG. 10) formed by radially outwardly projecting the front portion of the flange 81a; a portion 81d with a large diameter formed on the inner peripheral side of the positioning projection 81b; a brush portion 81c with a diameter smaller than that of the portion 81d and situated at further rearward portion than the portion 81d in the direction of optical axis as illustrated in FIGS. 9 and 10. The printed circuit board restriction ring 81 is restricted from moving in the direction of optical axis and rotating about it by the engagement between the positioning projection 81b and the positioning hole 21d on the inner peripheral surface of the engagement portion 21c while being engaged with a portion 21c on the inner peripheral wall (movable lens barrel accommodating portion 22) of the fixed ring 21. The printed circuit board restriction ring 81 is provided with a light intercepting brush 84 at the brush portion 81c. Tips of bristles of the brush 84 resiliently contact the outer peripheral surface of the movable lens barrel to intercept light at a gap between the ring 81 and the movable lens barrel 31.

A peripheral round portion 51c of a flexible printed circuit board 51 is positioned and secured in the space enclosed by the printed circuit board accommodating portion 24, the outer peripheral surface of the printed circuit board restriction ring 81 and the flange 81a. A portion where the flexible printed circuit board 51 protrudes from the accommodating portion 22 to the camera body 11 is not provided with the flange 81a like the first embodiment shown in FIG. 8.

A light intercepting curtain 86 is a ringshaped member made of resilient material and is attached to a forward side of the stiff support ring 85 in the direction of optical axis. The distance between inner and outer ends of the support ring 85 in the radial direction thereof is shorter than that of the light intercepting curtain 86. The light intercepting curtain 86 is attached to the support ring only at the outer peripheral portion 86a and a free end portion on inner side is bent toward the rearward direction parallel to the optical axis to form a rear bent portion 86b. The light intercepting curtain 86 is slidably engaged with the outer periphery of the movable lens barrel 31 such as to be situated between the front end portion of the fixed lens barrel 21 and the inner surface of the front wall 11a, which intercepts light between the restriction ring 81 and the movable lens barrel accommodating portion 22, as well as between the fixed lens barrel 21 and the movable lens barrel 31.

Further, the rear bent portion 86b of the light intercepting curtain 86 is accommodated in a space 48 enclosed by the portion with large diameter 81d. The light intercepting curtain 86 and the printed circuit board restriction ring 81, as light intercepting members, contact each other at the rear bent portion 86b and the portion 81d with large diameter on the same plane in the direction perpendicular to the optical axis, so that the dimensions of those members in the direction of the optical axis are shortened, and simultaneously light is further effectively intercepted between the fixed ring 21 and the movable lens barrel 31. This is in comparison with the examples illustrated in FIGS. 14 and 15, in which the portion with large diameter 81d is not formed on the printed circuit board restriction ring 81 and the inner peripheral free end portion of the light intercepting curtain 86 is directed in the forward direction of the optical axis. The difference is easily understood between the aforementioned embodiments of the present invention and the above-mentioned examples in the dimension of the light intercepting curtain in the direction of optical axis and the light intercepting function.

Figure 14:
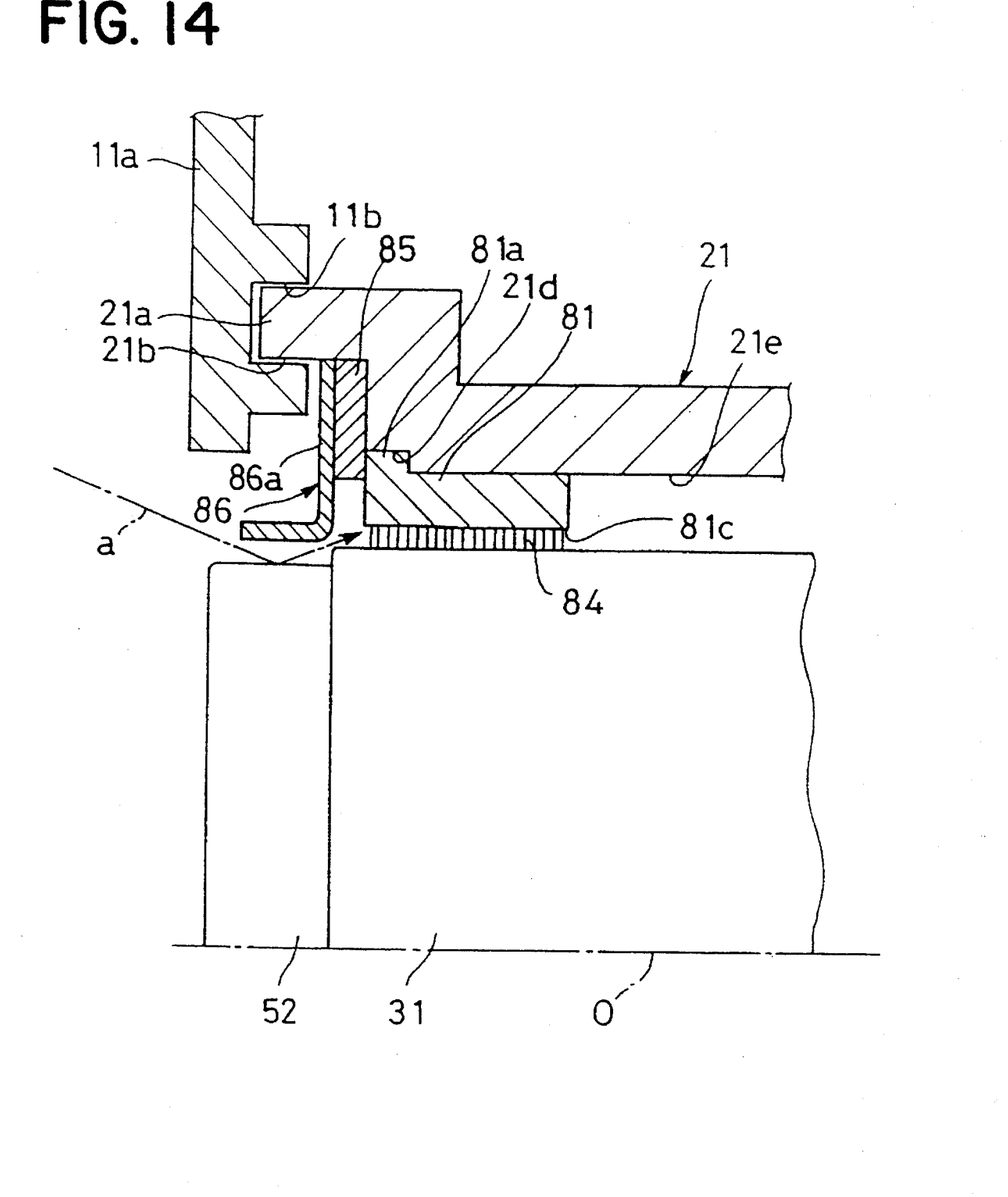
FIGS. 14 and 15 are enlarged cross-sectional views of a primary portion of a leaf-shutter-type camera according to the second embodiment of the present invention in which an inner peripheral free end portion of a light intercepting curtain is bent toward the front of the optical axis.
Figure 15:
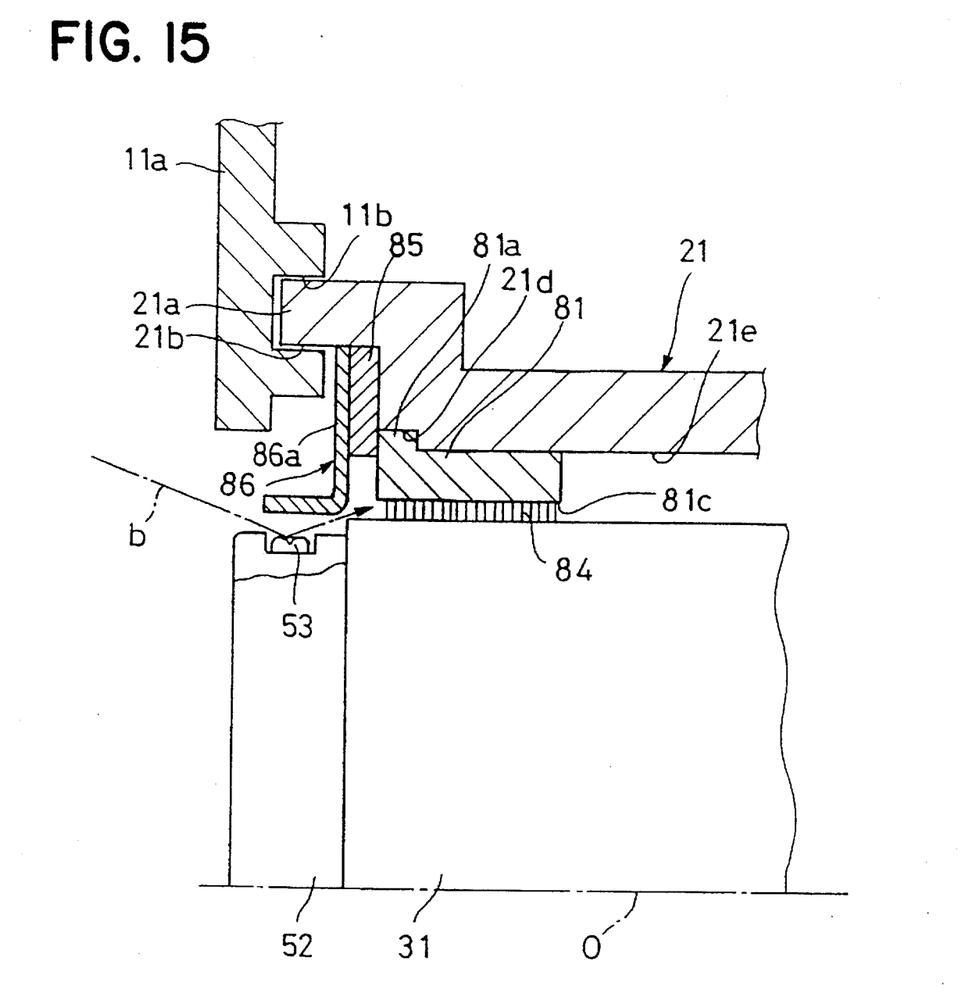

When the decorative plate 52 which forms a tiered portion with a diameter smaller than that of the movable lens barrel 31 does not have a dull surface but has a polished surface in the accommodated state of the movable lens barrel 31 shown in FIG. 14, external light "a" reflected on the outer surface of the decorative plate 52 enters from the gap between the inner peripheral free end portion of the light intercepting curtain 86 and the decorative plate 52, resulting in incomplete light interception. Further, as illustrated in FIG. 15, even if the decorative plate 52 has a dull surface, when the plate 52 is secured through machine screws, external light b reflected by the machine screws 53 enters from the gap between the inner peripheral free end of the light intercepting curtain 86 and the decorative plate 52 like the example shown in FIG. 14, resulting in incomplete light interception. On the other hand, with the above-mentioned construction according to the present invention, the inner peripheral free end (rear bent portion 86b) is bent in the rearward direction of the optical axis to contact the movable lens barrel 31, and the rear bent portion 86b and the printed circuit board restriction ring 81 contact each other at a part of each member on the same plane in the direction perpendicular to the optical axis in the accommodated state of the movable lens barrel 31. Both external light "a" reflected by the decorative plate 52 and external light "d" reflected by the machine screws 53 are intercepted by the rear bent portion 6b of the light intercepting curtain 86. The printed circuit board restriction ring 81 strengthens the light intercepting function of the rear bent portion 86b.

The present embodiment is applicable to a lens barrel of a camera with a barrel other than a collapsible barrel, and a zoom lens barrel, having no movable lens barrel.

As described above, in the light intercepting mechanism according to the present invention, first and second light intercepting rings are slidably engaged with a movable lens barrel with the positions of optical axes thereof different from each other; the first and second light intercepting rings are secured to a fixed lens barrel; an inner peripheral portion of the first light intercepting ring is situated in a forward direction of optical axis is rearwardly bent; the second light intercepting ring situated in a rearward direction is provided with an accommodating space for the rear bent portion; and two light intercepting rings are disposed between the fixed lens barrel and the movable lens barrel in a line in the direction of the optical axis, which securely prevents the intrusion of the external light. Further, the rear bent portion which is bent in the rearward direction of the optical axis is accommodated in an accommodating space of the second light intercepting ring and parts of the bent portion and the second light intercepting ring contact each other on a plane vertical to the optical axis, which shortens the dimension of the light intercepting mechanism in the direction of optical axis, although two light intercepting rings are provided.

Further, in the light intercepting mechanism according to the present invention, the movable lens barrel moves between an extended position and an accommodated position relative to a camera body and a tiered portion with a small diameter is provided on the same plane as a front wall of the camera body at the accommodated position. The rear bent portion is not in contact with the tiered portion throughout the range that the movable lens barrel travels between the extended position and the accommodated position, which provides no gap between the first light intercepting ring and the rear bent portion, resulting in further effective light intercepting function at a portion between the fixed lens barrel and the movable lens barrel.

Still further, in the light intercepting mechanism according to the present invention, it is possible to mount a flexible printed circuit board which is extracted from the rear of the movable lens barrel in the direction of optical axis and is drawn from the front portion of the fixed lens barrel out of the lens barrel. The second light intercepting member functions as a printed circuit board restriction mechanism for also restricting the movement of the flexible printed circuit board in relation to the fixed lens barrel. That is, the second light intercepting means works as mechanism for also sustaining the flexible printed circuit board on the fixed lens barrel, contributing to the reduction in the number of parts of cameras.

I claim:

1. A flexible printed circuit board mounting structure in a lens barrel, comprising:

a fixed lens barrel integrally secured to a camera body;

a movable lens barrel positioned in said fixed lens barrel and movable in a direction of an optical axis of a lens;

an electrically driven device mounted to said movable lens barrel;

a controller for controlling said electrically driven device, said controller being mounted to said camera body;

a light intercepting member disposed between said fixed lens barrel and said movable lens barrel, and a flexible printed circuit board electrically connecting said controller and said electrically driven device;

wherein said flexible printed circuit board is connected to said electrically driven device and has a first path extending rearwardly in said movable lens barrel, a second path extending in a space formed between said fixed lens barrel and said movable lens barrel, said first path and said second path being folded in a serpentined manner, and a third path extending in a space formed between an outer periphery of said light intercepting member and an inner peripheral portion of said fixed lens barrel.

2. A flexible printed circuit board supporting structure as claimed in claim 1, wherein said light intercepting member includes a C-shaped printed circuit board restriction ring made of resilient material for resiliently fastening to an outer peripheral surface of said movable lens barrel.

3. A flexible printed circuit board supporting structure as claimed in claim 1, wherein said fixed lens barrel includes an engagement portion and said printed circuit board restriction ring includes a positioning engagement portion engaged with said engagement portion of said fixed lens barrel to prevent said printed circuit board restriction ring from rotating about said optical axis and moving in said direction of said optical axis.

4. A flexible printed circuit board mounting structure as claimed in claim 1, wherein said fixed lens barrel is provided with a concave printed circuit board accommodating concave portion on an inner surface thereof, at least at a position opposing said light intercepting member.

5. A flexible printed circuit board mounting structure as claimed in claim 1, wherein said light intercepting member comprises a C-shaped printed circuit board restriction ring made of resilient material for resiliently fastening an outer peripheral surface of said movable lens barrel and a light intercepting curtain inserted between said C-shaped printed circuit board restriction ring and said movable lens barrel.

6. A flexible printed circuit board mounting structure as claimed in claim 5, wherein, said printed circuit board restriction ring is provided with a flange at a front end of an outer peripheral portion.

7. A flexible printed circuit board mounting structure as claimed in claim 6, wherein said flexible printed circuit board is positioned in a space formed by a rear end surface of said flange, an outer peripheral surface of said printed circuit board restriction ring, and an inner peripheral portion of said fixed lens barrel.

8. A flexible printed circuit board mounting structure as claimed in claim 7, wherein said light intercepting curtain is attached to a support ring of said fixed lens barrel, and an inner peripheral portion of said light intercepting curtain on said movable lens barrel side is bent in one of a forward or rearward direction of said optical axis.

9. A flexible printed circuit board mounting structure as claimed in claim 8, wherein said printed circuit board restriction ring is provided with a light intercepting brush on an inner periphery which slidably contacts an outer periphery of said movable lens barrel.

10. The flexible printed circuit board mounting structure in a lens barrel of claim 1, wherein said light intercepting member guides said flexible printed circuit board in said space formed between said outer periphery of said light intercepting member and said inner peripheral portion of said fixed lens barrel.

11. A light intercepting device of a lens barrel comprising:
a fixed lens barrel secured to a camera body;
a movable lens barrel supported in said fixed lens barrel and movable in a direction of an optical axis of a lens; and
a light intercepting device for preventing light from entering between said fixed lens barrel and said movable lens barrel;
said light intercepting device comprising:
a first light intercepting ring fixed to said fixed lens barrel and slidably engaged with an outer periphery of said movable lens barrel; and
a second light intercepting ring fixed to said fixed lens barrel and slidably engaged with an outer periphery of said movable lens barrel, said second light intercepting ring being located behind said first light intercepting ring in the optical axis direction;
wherein said first light intercepting ring has a flanged portion secured to said fixed lens barrel and a cylindrical portion in contact with said outer periphery of said movable lens barrel, said cylindrical portion extending rearwardly from an inner edge of said flanged portion and wherein said second light intercepting ring has an annular portion which forms an accommodating space for said cylindrical portion.

12. A light intercepting device as claimed in claim 11, wherein said second light intercepting ring is provided with a light intercepting brush on an inner peripheral portion thereof in a rear portion of said accommodating space.

13. A light intercepting device as claimed in claim 12, wherein said movable lens barrel moves between an extended position and an accommodated position relative to said camera body, and a tiered portion with a small diameter is provided on the same plane as a front wall of said camera body at said accommodated position, and said rear bent portion is not in contact with said tiered portion throughout a range that said movable lens barrel travels between said extended position and said accommodated position.

14. The light intercepting device as claimed in claim 11, wherein a flexible printed circuit board extends from a rear end of said movable lens barrel in said direction of the optical axis and extends from a front portion of said fixed lens barrel, and said second light intercepting ring serves as a printed circuit board restriction ring for pressing said flexible printed circuit board to an outer periphery of said movable lens barrel to resiliently prevent said flexible circuit board from moving in relation to said fixed lens barrel.

15. A light intercepting device of a lens barrel comprising:
a first lens barrel;
a second lens barrel positioned in said first lens barrel;
a light intercepting device for preventing light from entering between said first and second barrels;
said light intercepting device comprising:
a first light intercepting ring fixed to said fixed lens barrel and engaged with an outer periphery of said second lens barrel; and
a second light intercepting ring fixed to said first lens barrel and engaged with an outer periphery of said second lens barrel, said second light intercepting ring being located behind said first light intercepting ring in an optical axis direction;
wherein said first light intercepting ring has a flanged portion secured to said first lens barrel and a cylindrical portion in contact with said outer periphery of said second lens barrel, said cylindrical portion extending rearwardly from an inner edge of said flanged portion and wherein said second light intercepting ring has an annular portion which forms an accommodating space for said cylindrical portion.

* * * * *

UNITED STATES PATENT AND TRADEMARK OFFICE
CERTIFICATE OF CORRECTION

PATENT NO. : 5,581,412
DATED : December 3, 1996
INVENTOR(S) : Hitoshi TANAKA

It is certified that error appears in the above-indentified patent and that said Letters Patent is hereby corrected as shown below:

At column 11, lines 16-17 (claim 4, lines 3-4), delete "concave" (second occurrence).

Signed and Sealed this

Twenty-second Day of April, 1997

Attest:

BRUCE LEHMAN

*Commissioner of Patents and Trademarks*

Attesting Officer